Patented July 24, 1951

2,562,030

UNITED STATES PATENT OFFICE 2,562,030

PRODUCTION OF 17-HYDROXY 20-KETO STEROID COMPOUNDS

Thomas F. Gallagher, Flushing, N. Y., and Theodore H. Kritchevsky, Chicago, Ill., assignors to Research Corporation, New York, N. Y., a corporation of New York No Drawing. Application June 27, 1950, Serial No. 170,696

9 Claims. (Cl. 260—397.4)

This invention relates to a method for the introduction of a tertiary alcohol group at C17 of the steroid nucleus of steroid compounds containing a carbon side chain at C17. The method of the invention is particularly useful as a step in the preparation of substances having the properties of the 17-hydroxy adrenal cortical hormones, such as 17-hydroxy-desoxycorticosterone (Reichstein's Compound S) and 17-hydroxy-11-dehydrocorticosterone (Kendall's Compound E).

We have found that by subjecting an enol ester of a 20-ketosteroid to the action of an organic peracid, particularly aromatic percarboxylic acids, such as perbenzoic and perphthalic acids and saturated aliphatic percarboxylic acids, such as peracetic and persuccinic acids, preferably in an organic liquid solvent such as benzene or chloroform, there is obtained the corresponding 17-hydroxy-20-ketosteroid in which the tertiary alcohol group has the same steric configuration as that found in the naturally occurring adrenal cortical hormones.

The following are typical examples of the method of the invention:

Example I 1.51 g. of amorphous preparation of 3α,20-diacetoxy-Δ$^{17,20}$-pregnene, as prepared by the procedure of Marshall et al. (J. Am. Chem. Soc., 70, 1837, 1948) is dissolved in 8 ml. of a chloroform solution containing 0.69 g. of perbenzoic acid. The solution becomes warm spontaneously and after storage at room temperature for 2 hours, the solution is diluted with ether, washed with dilute aqueous acid and dilute aqueous base, and the neutral residue in the ether is obtained by distillation of the solvent. The neutral reaction product is saponified at room temperature for 30 minutes with dilute base and 50 per cent ethanol solution and the saponified product obtained by extraction with ether. The crystalline residue after recrystallization from acetone yields pure 3α,17α-dihydroxypregnan-20-one with M. P. 208–209.5° C.; $[α]_D^{25}=+63°$ C. (ethanol).

The 3α,17α-dihydroxypregnan-20-one of Example I can be converted into 17-hydroxy-desoxycorticosterone (Reichstein's Compound S) by the following series of reactions:

The formate of 3α,17α-dihydroxypregnan-20-one is brominated with approximately 1 mole of bromine in glacial acetic acid solution. 5.93 g. of 3α-formoxy-17α-hydroxypregnan-20-one are suspended in 60 cc. of glacial acetic acid and 32.8 cc. of 0.5 molar bromine in acetic acid are added. 10 cc. of a solution of HBr in glacial acetic acid are added to the mixture and in the course of 30 minutes the solution decolorizes. The corresponding 21-bromo product is obtained by ether extraction.

3.75 g. of the 3α-formoxy-17α-hydroxy-21-bromopregnan-20-one are dissolved in 300 cc. redistilled methanol and 80 cc. of 1.2 N dry hydrogen chloride in methanol are added to the cold solution. The solution is stored overnight at 5° C. and the solvent is removed under diminished pressure at a low temperature. The neutral product is removed by ether extraction and isolated after washing with water, dilute sodium carbonate solution and water and removal of the solvent. After recrystallization from ethyl acetate the product melts at 202–204° C. 3.3 g. of this product, namely, 3α,17α-dihydroxy-21-bromopregnan-20-one are dissolved in 35 cc. tertiary butanol, and 2.1 g. of N-bromoacetamide, .7 cc. of pyridine and .5 cc. water are added. The solution is stored at 5° C. for 16 hours, and the product is isolated by ether extraction followed by washing with dilute acid, water and dilute carbonate solution and again with water. The solvent is removed and the crystalline residue 17α-hydroxy-21-bromopregnane-3,20-dione melts at 203–204° C.; $[α]_D=+81°$ (ethanol). It is saponified to the corresponding 21-hydroxy compound as follows: 201 mg. of the 21-bromo compound are dissolved in 100 ml. of 95 per cent ethanol. 88 cc. of water are added and the solution is flushed well with nitrogen gas. 12 cc. of approximately normal NaOH are added. After ten minutes most of the halogen is ionic. The solution is then extracted with ether and washed with dilute alkali and with dilute brine. The neutral fraction crystallizes upon removal of the solvent. The neutral product of hydrolysis is acetylated with pyridine and acetic anhydride and separated from a small amount of impurity by chromatography. The product, which is 17α-hydroxy-21-acetoxypregnane-3,20-dione, melts at 199° C.;

$$[α]_D=+81° \text{ C.}$$

It is converted to the acetate of Reichstein's Compound S by bromination in glacial acetic acid with one mole of bromine followed by removal of HBr from the product by means of pyridine, dinitrophenylhydrazine or other dehydrohalogenating agent.

Example II

In a similar fashion 3β,17α-dihydroxy-allopregnan-20-one is prepared from the enol acetate of allopregnanolone (3,20-diacetoxy-Δ$^{17,20}$-pregnene). 1.02 g. of the enol acetate are treated with 0.55 g. of perbenzoic acid in 5.6 cc. of chloroform. After isolation of the neutral product, followed by saponification at room temperature as in Example I, the product 3β,17α-dihydroxy-allopregnan-20-one, with a melting point 257–259° C., $[\alpha]_D = +31.7°$ C. (ethanol), is obtained.

Example III 485 mg. of the diendiol triacetate of 3α-hydroxypregnan-11,20-dione in 3 ml. benzene are treated with 3.5 ml. of 1.75 M perbenzoic acid solution in benzene. The solution warms spontaneously. After standing two hours at room temperature the product is isolated by ether extraction followed by washing with dilute alkali and water. The reaction product melts at 193–194° C.; $[\alpha]_D^{29} = +74.2°$ C. (chloroform). Upon saponification with excess alkali in 50 per cent ethanol solution at room temperature for about 30 minutes, the neutral product from the reaction is isolated by ether extraction. It is 3α,17α-dihydroxypregnan-11,20-dione of melting point 198–201° C.

By methods analogous to those described in Example II for the preparation of Reichstein's Compound S, the 3α,17α-dihydroxypregnan-11,20-dione may be converted into 17-hydroxy-11-dehydrocorticosterone (Kendall's Compound E).

Other organic peracids may be substituted in equimolecular amounts for the perbenzoic acid in the foregoing examples.

This application is a continuation-in-part of our application Serial No. 118,466 filed September 28, 1949, now abandoned.

We claim:

1. A method which comprises subjecting an enol carboxylic acid ester of a 20-ketosteroid to the action of an organic peracid and saponifying the product to produce the corresponding 17-hydroxy-20-ketosteroid.

2. A method which comprises subjecting an enol carboxylic acid ester of a 20-ketosteroid to the action of an organic peracid in an organic liquid solvent and saponifying the product to produce the corresponding 17-hydroxy-20-ketosteroid.

3. A method which comprises subjecting an enol carboxylic acid ester of a 20-ketosteroid to the action of perbenzoic acid in an organic liquid solvent and saponifying the product to produce the corresponding 17-hydroxy-20-ketosteroid.

4. A method which comprises subjecting an enol acetate of a 20-ketosteroid to the action of perbenzoic acid in an organic liquid solvent and saponifying the product to produce the corresponding 17-hydroxy-20-ketosteroid.

5. A method which comprises subjecting 3α,20-diacetoxy-$\Delta^{17,20}$-pregnene to the action of perbenzoic acid and saponifying the product to produce 3α,17α-dihydroxy-pregnan-20-one.

6. A method which comprises subjecting the diendiol triacetate of 3α-hydroxy-pregnan-11,20-dione to the action of perbenzoic acid and saponifying the product to produce 3α,17α-dihydroxy-pregnan-11,20-dione.

7. In the production of 17-hydroxy-20-ketosteroids the step which comprises subjecting an enol carboxylic acid ester of a 20-ketosteroid to the action of an organic peracid.

8. In the production of 17-hydroxy-desoxycorticosterone, the step which comprises subjecting 3α,20-diacetoxy-$\Delta^{17,20}$-pregnene to the action of perbenzoic acid.

9. In the production of 17-hydroxy-11-dehydrocorticosterone, the step which comprises subjecting the diendiol triacetate of 3α-hydroxy-pregnan-11,20-dione to the action of perbenzoic acid.

THOMAS F. GALLAGHER.
THEODORE H. KRITCHEVSKY.

No references cited.